United States Patent [19]
Kirkpatrick

[11] 3,781,878
[45] Dec. 25, 1973

[54] MEANS FOR SUPPRESSING GROUND CLUTTER IN AIRBORNE RADAR

[76] Inventor: George M. Kirkpatrick, 202 David Dr., Syracuse, N.Y. 13212

[22] Filed: July 29, 1971

[21] Appl. No.: 167,134

[52] U.S. Cl. ........ 343/5 W, 343/7 TA, 343/100 SA
[51] Int. Cl. .............................................. G01s 9/02
[58] Field of Search .......... 343/5 W, 7 TA, 100 SA

[56] References Cited
UNITED STATES PATENTS

| | | | |
|---|---|---|---|
| 3,127,604 | 3/1964 | Herriott | 343/7 TA |
| 3,251,057 | 5/1966 | Buehler et al. | 343/5 W |
| 3,141,161 | 7/1964 | King | 343/7 TA |
| 3,085,243 | 4/1963 | Bond | 343/7 TA |
| 3,197,776 | 7/1965 | Winn | 343/16 M |
| 3,302,200 | 1/1967 | Atlas | 343/5 W |

*Primary Examiner*—Benjamin A. Borchelt
*Assistant Examiner*—G. E. Montone
*Attorney*—Cohen & Liss

[57] ABSTRACT

Method and means for detecting both long and short range weather targets in the presence of ground clutter in which a receive antenna beam is steered from a first generally elevated beam position to a second generally horizontal beam position in accordance with a beam steering program.

4 Claims, 9 Drawing Figures

INVENTOR,
GEORGE M. KIRKPATRICK
BY
COHEN & LISS
ATTORNEYS

INVENTOR,
GEORGE M. KIRKPATRICK
BY
COHEN & LISS
ATTORNEYS

MEANS FOR SUPPRESSING GROUND CLUTTER IN AIRBORNE RADAR

BACKGROUND OF THE INVENTION

This invention relates to an airborne radar system, and more particularly, to a radar system for detecting weather targets such as thunderstorms when confusing clutter targets are present.

Ground clutter, which is defined as a conglomeration of unwanted radar echoes, presents a significant problem in airborne radar systems in that many times it is necessary to detect elevated weather targets over the same region in which ground clutter is present. Since the radar cross-section of the ground clutter is often comparable to the radar cross-section of the target, the desired target echoes are often lost in the ground clutter echoes and a misleading display is presented to the radar operator.

One known approach to eliminating ground clutter is for the operator to manually adjust the tilt of the antenna so that the antenna beam is raised above the horizontal plane. One serious disadvantage to this approach, however, is that the beam will be directed above weather targets at a longer range. If the antenna beam is directed toward long range targets, weather targets at short range will be obscured by clutter. This invention overcomes such disadvantages of prior art systems by providing a clutter suppression method and system that is effective for both short and long range weather targets.

OBJECTS

It is therefore an object of this invention to provide a method of suppressing ground clutter in an airborne weather radar system.

It is another object of this invention to provide a method for suppressing clutter in an airborne weather radar system that can be used in the detection of both short and long range weather targets.

It is a further object of this invention to provide appropriate circuitry for suppressing ground clutter in an airborne weather radar system.

SUMMARY OF THE INVENTION

Briefly stated, the above objects, in one embodiment of the invention, are attained by using monopulse techniques in which a receive antenna beam is steered from a first generally elevated beam position to a second generally horizontal beam position in accordance with a beam steering program. The program first maintains the beam in an elevated position so that the beam does not pick up ground clutter and then takes advantage of the fact that clutter attenuates as a function of range to steer the beam to a horizontal position to detect long range targets.

DESCRIPTION OF THE DRAWINGS

While the specification concludes with claims particularly pointing out and distinctly claiming the subject matter which is regarded as the invention, it is believed that the invention could be better understood from the following description taken in connection with the accompanying drawings in which:

DESCRIPTION OF THE PREFERRED EMBODIMENT

Figure 1:
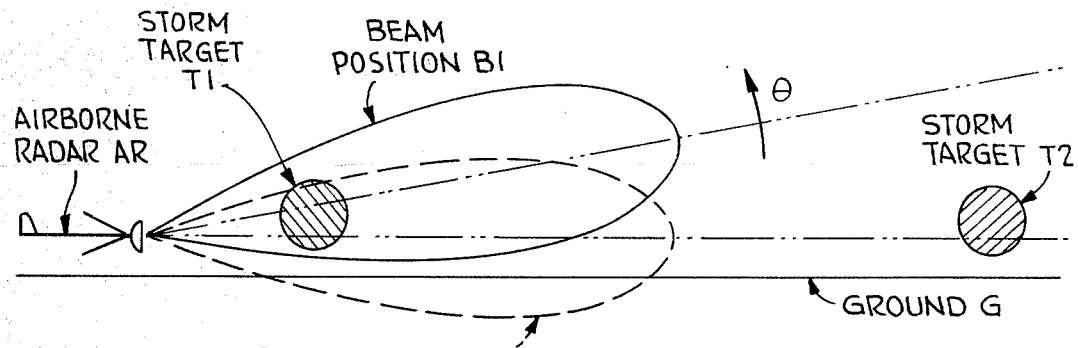
FIG. 1 is a schematic representation of the airborne weather radar searching for a target according to the invention.

Referring to FIG. 1, there is shown an airborne radar AR which transmits radar pulses toward short range target $T_1$, and long range target $T_2$ and provides a receive antenna beam. The receive beam is shown in an elevated beam position $B_1$ (solid line) and generally horizontal beam position $B_2$ (dotted line).

In order to detect airborne weather targets, airborne radar AR emits a short pulse of microwave energy, called a range pulse, that flows radially from the antenna outward toward the targets $T_1$ and $T_2$ and the ground G. When the range pulse reaches the ground, it illuminates a region, whose shape is determined by the antenna configuration and characteristics of the range pulse, which reflects clutter echoes back along the receive beam to the airborne radar AR. The radar response is made selective so that the beam in beam position $B_1$ is used to detect short range target $T_1$ and the beam in beam position $B_2$ is used to detect long range target $T_2$. It is clear from FIG. 1 that by using the beam in position $B_1$ to detect target $T_1$, ground clutter is suppressed. Because of beam $B_1$'s elevated position there are no clutter echoes received. By utilizing the fact that the clutter echoes attenuate with increased range, the beam in position $B_2$ detects long range target $T_2$ free of clutter echoes.

According to the invention, antenna beam $B_1$ is steered from elevated beam position $B_1$ to horizontal beam position $B_2$ by a beam steering program as the range to ground clutter increases so that both targets $T_1$ and $T_2$ will be presented without clutter.

Figure 2:
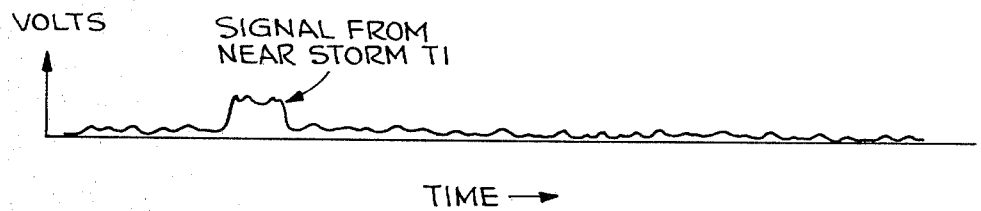
FIG. 2 is a waveform diagram of voltage as a function of time representing the range display for an airborne radar, without the invention, presenting only short range weather targets.
Figure 3:
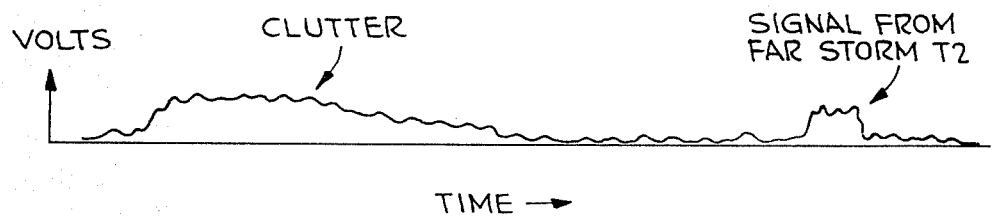
FIG. 3 is a waveform diagram of voltage as a function of time representing a range display for an airborne radar, without the invention, presenting long range weather targets with the short range weather target obscured by ground clutter.
Figure 4:
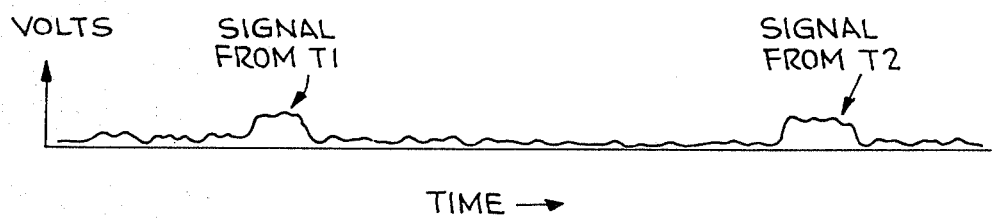
FIG. 4 is a waveform diagram of voltage as a function of time representing a range display for an airborne radar, with the invention, presenting near and far weather targets without ground clutter.

A further explanation can be obtained by referring to FIGS. 2, 3 and 4. FIG. 2, which is a plot of voltage versus time, shows the waveform obtained when the antenna beam in position $B_1$ is used to detect short range target $T_1$. FIG. 3 shows the waveform obtained when the antenna beam in position $B_2$ is used to detect long range target $T_2$. As can be seen, from FIG. 3 ground clutter obscures the short range target $T_1$. FIG. 4 shows the waveform obtained when the beam is steered from position $B_1$ to position $B_2$ so that both targets, $T_1$ and $T_2$ are presented without clutter.

Figure 5:
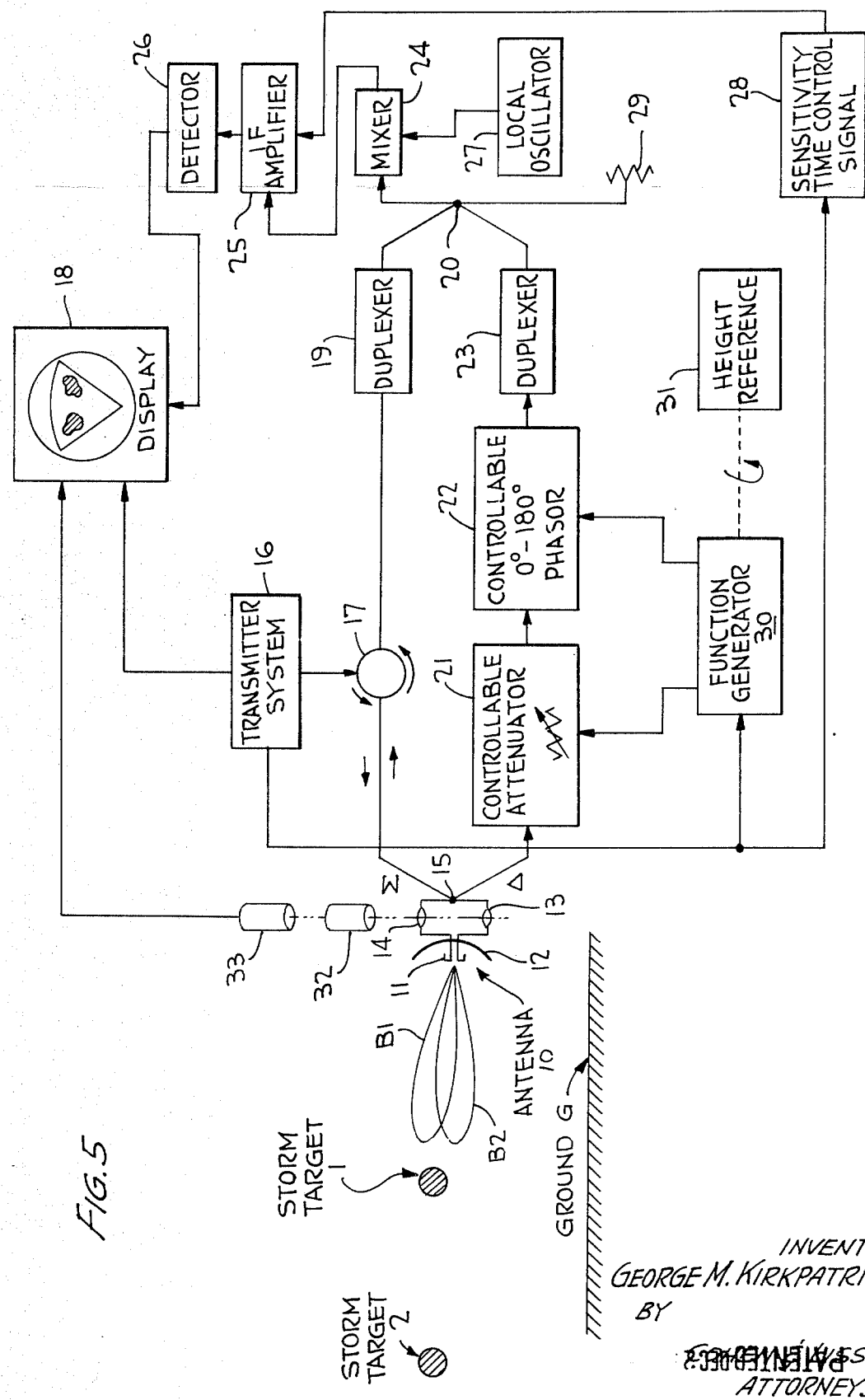
FIG. 5 is a schematic diagram of the microwave and antenna components of an airborne weather radar system which steers the receiving antenna beams in the elevation plane according to the invention.

The antenna and circuitry which are used to achieve clutter free, long and short range target detection is shown in FIG. 5. An antenna A is provided with two radiators 11 and 12 that cooperate to form the receive antenna beam which is steered from position $B_1$ to position $B_2$. Radiators 11 and 12 are connected by rotating joints 13 and 14 to a hybrid sum and difference junction 15. In order to transmit the range pulse, a transmitter 16 is coupled through a circulator 17 to the $\Sigma$ terminal of the hybrid junction 15. The transmitter 16 is also coupled to a Plan Position Indicator (PPI) display 18 so that a timing signal can be provided to the display. While both radiators are shown energized by the ranging pulse, only one radiator can be energized to illuminate a particular direction.

In addition to being connected to the transmitter 16 through the circulator 17, the $\Sigma$ terminal of the hybrid junction 15 is coupled through the circulator 17 through a duplexer 19 to a second hybrid junction 20. The $\Delta$ terminal of hybrid junction 15 is connected through a controllable attenuator 21, a controllable 0° − 180° phasor 22 and a second matching duplexer 23 to the hybrid junction 20.

To provide a display of the target echoes, one terminal of the hybrid junction 20, is coupled through a mixer 24, IF amplifier 25, and detector 26, to the PPI display 18. A local oscillator 27 provides a hetrodyning signal to the mixer 24 to convert the RF signals to IF signals. IF amplifier 25 is also coupled to a sensitivity time control circuit 28 which is connected to the transmitter 16. The other terminal of hybrid junction 20 is terminated in a matched load 29.

In order to steer the antenna from position $B_1$ toward position $B_2$ a function generator 30 is provided, which receives inputs from transmitter 16 and height reference 31 and is coupled to controllable attenuator 21 and the controllable phasor 22. The function generator 30 supplies a beam steering program.

To cause the antenna A to scan in the azimuth plane, motor 32 is provided. An angle resolver 33, which provides angle information, is coupled to the PPI display 18.

The circuit in FIG. 5 operates in the following manner.

Transmitter 16 feeds the range signals as RF pulses to the $\Sigma$ terminal of the hybrid junction 15. The RF pulses are then emitted equally by the radiators 11 and 12 of antenna A toward the storm targets $T_1$ and $T_2$.

The range signal strikes the targets $T_1$ and $T_2$ and also illuminates clutter patches on the ground G, as shown in FIG. 1 which causes echo signals to be returned along the receive beam to radiators 11 and 12. The return signals are combined in hybrid junction 15 and the sum $\Sigma$ and difference $\Delta$ signals are directed along separate paths before recombination at the second hybrid junction 20 to form a single receive beam according to monopulse techniques. The $\Sigma$ signal is passed by the circulator 17, and the duplexer 19; while the $\Delta$ signal goes through the controllable attenuator 21, the controllable phasor 22 and the matching duplexer 23.

The combined $\Sigma$ and $\Delta$ signals which form the steerable receive beam are then passed through the mixer 24, the IF amplifier 25, and the detector 26 and then to the display 18 so that the echoes from the targets can be observed. Display 18, also receives timing signals from transmitter 16 and angle signals from the angle resolver 33. It should be noted that the signal derived from the antenna can be used for other purposes than display, such as automatic control.

In order to detect both long range and short range weather targets free of clutter, as previously described, the antenna beam is steered from position $B_1$ toward beam position $B_2$ by varying the attenuation of the controllable attenuator 21 and the phase of phasor 22, both of which are controlled by function generator 30 according to the beam steering program. Immediately following the transmission of the range pulse from the transmitter 16, the attenuation of the controllable attenuator 21 is reduced to a minimum and the entire $\Delta$ signal is passed to the hybrid junction 20. Upon addition of the $\Sigma$ signal to the $\Delta$ signal in the hybrid junction 20, the combined signals are equivalent to a receive beam in elevated beam position $B_1$. At a rate determined by the beam steering program in function generator 30, attenuation is introduced in the $\Delta$ channel causing the antenna beam to move toward beam position $B_2$. When a large attenuation is present in the controllable attenuator 21, the receiving beam will occupy a position midway between positions $B_1$ and $B_2$. At this time, a phase shift of 180° is introduced in the controllable phasor 22 and the attenuation in the controllable attenuator 21 is reduced to a minimum. The receive antenna beam is then in the beam position $B_2$ and is in a favorable position to receive echoes from distant targets. The operation of the attenuator 21 and the phasor 22 is illustrated by FIG. 6.

Figure 6:
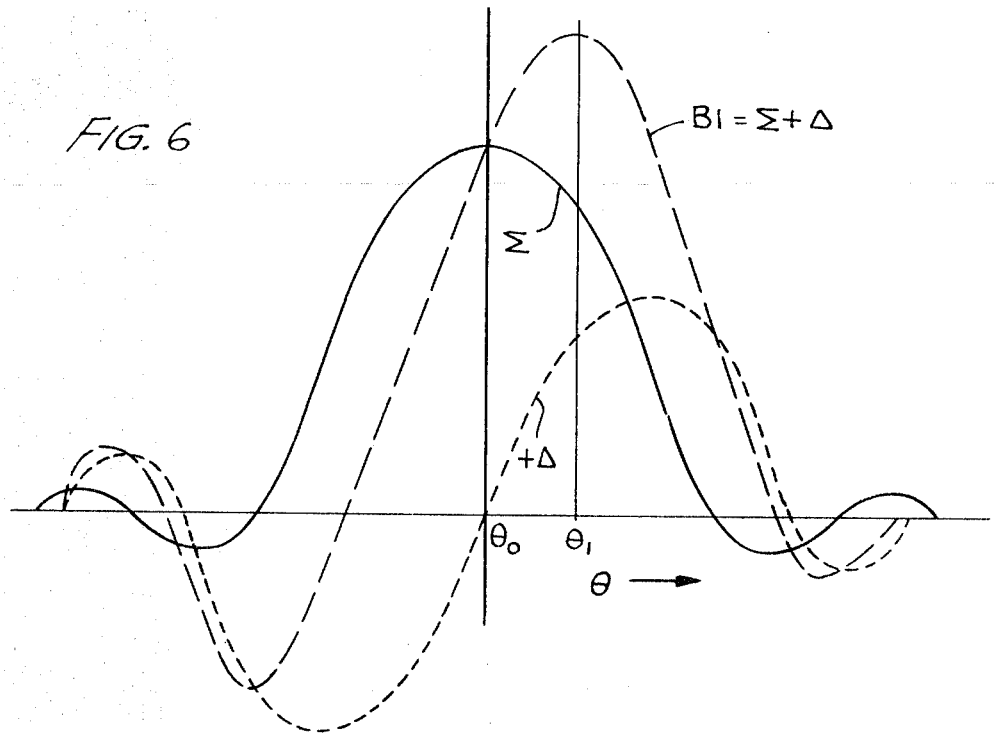
FIG. 6 is a waveform diagram of an echo signal amplitude as function of elevation angle to illustrate the steering characteristic of the radar system of FIG. 5.

FIG. 6 shows a plot of the $\Sigma$ and $\Delta$ signals and the combined signal that results in beam position $B_1$ when the attenuation in the $\Delta$ channel is reduced to a minimum immediately after transmission of the range pulse. This corresponds to point $\theta_1$ on the $\theta$ axis of FIG. 6. When the $\Delta$ signal is completely attenuated, by controllable attenuator 21, as shown at point $\theta_0$ on FIG. 6, the antenna beam will move from its original position $B_1$ to a central position $\theta_0$ designated by the $\Sigma$ signal. When the $\Delta$ signal is phase shifted 180° by the controllable phasor 22, the $\Delta$ signal will be subtracted from the $\Sigma$ signal in the hybrid junction 20 and the antenna beam will move further downward and occupy a beam position where it can readily detect long range weather targets.

The antenna beam that is formed by combining the $\Delta$ and $\Sigma$ signals can be shifted through a limited angle as is apparent from FIG. 6 and this angle is approximately one beam width. To obtain a greater angular range in the elevation plane, additional antenna feeds or electrical scanning can be used. A combination of electrical beam position control by phase shifters and attenuation of the $\Delta$ signal can also be employed.

Figure 7:
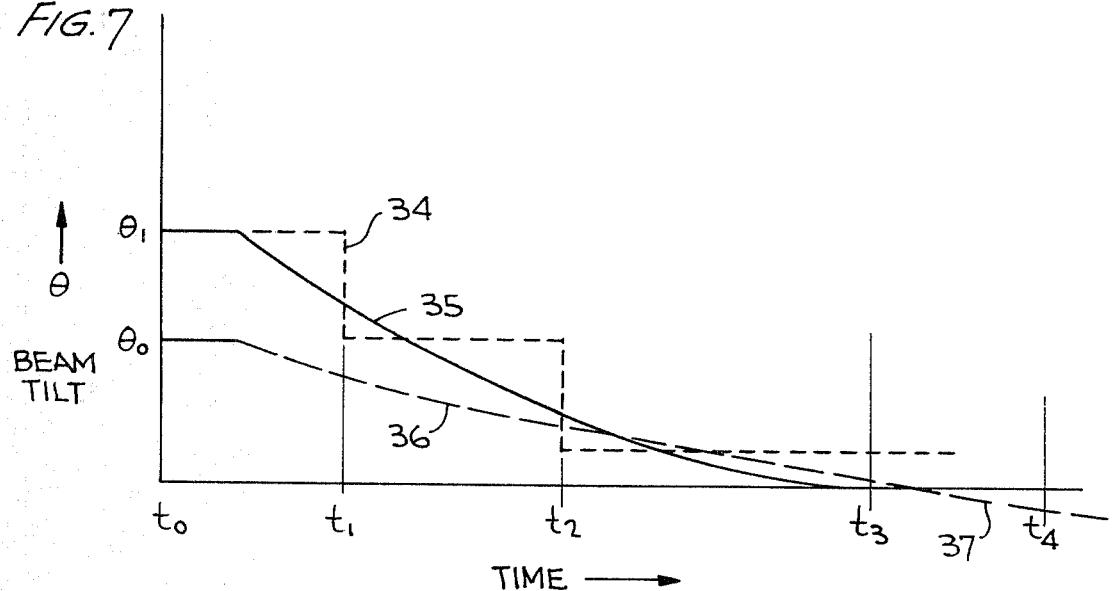
FIG. 7 is a plot of the beam position as a function of time for two modes of operation of the airborne radar system of FIG. 5.

Referring to FIG. 7, typical programmed curves of elevation beam position as a function of time (range) are shown by the curves 34, 35 and 36. Curves 34 and 35 show the steering operation as step-wise or continuous, respectively, while curve 36 shows the continuous approach, but with the airborne radar at a higher altitude. Referring to curves 34 and 35, it can be seen that immediately after the range pulse is transmitted at time $t_0$, the receive beam is held in the upward position as shown at $\theta_1$ to keep ground clutter reception to a minimum. As the range increases with time, the upward beam is moved downward from its original position $B_1$ either continually as in curve 34 or in steps as in curve 35. After the maximum range for ground clutter is reached at time $t_3$, the beam has been steered to a nearly horizontal position to detect echo returns from storm targets at long range.

If the aircraft is operating at a higher altitude, the magnitude of the clutter echoes are less because the distance from the ground to the radar is greater but the clutter extends for a longer range. In that case, the curve for the beam position will start with less elevation as shown at $\theta_0$ in FIG. 7, but since the radar is at a higher altitude, the beam is tilted downwardly at a lower rate and may be directed below the horizontal to intercept long range targets as shown at 37 in FIG. 7. The necessary control for beam steering is provided by programs stored and generated in the function generator 30 of FIG. 5. Circuits for the generation of the required time functions are the subject matter of many publications and will not be discussed in detail.

As shown in FIG. 5, provisions can be made for the manual insertion of the aircraft height above the ground into the function generator to increase the altitude range over which ground clutter can be suppressed. Modified programs can be used for flight over sloping ground.

If the beam is steered in elevation in steps as might be desired in some applications, the display can be blanked at brief intervals such as at $t_1$ or $t_2$ to prevent the presentation of false targets.

Figure 8:
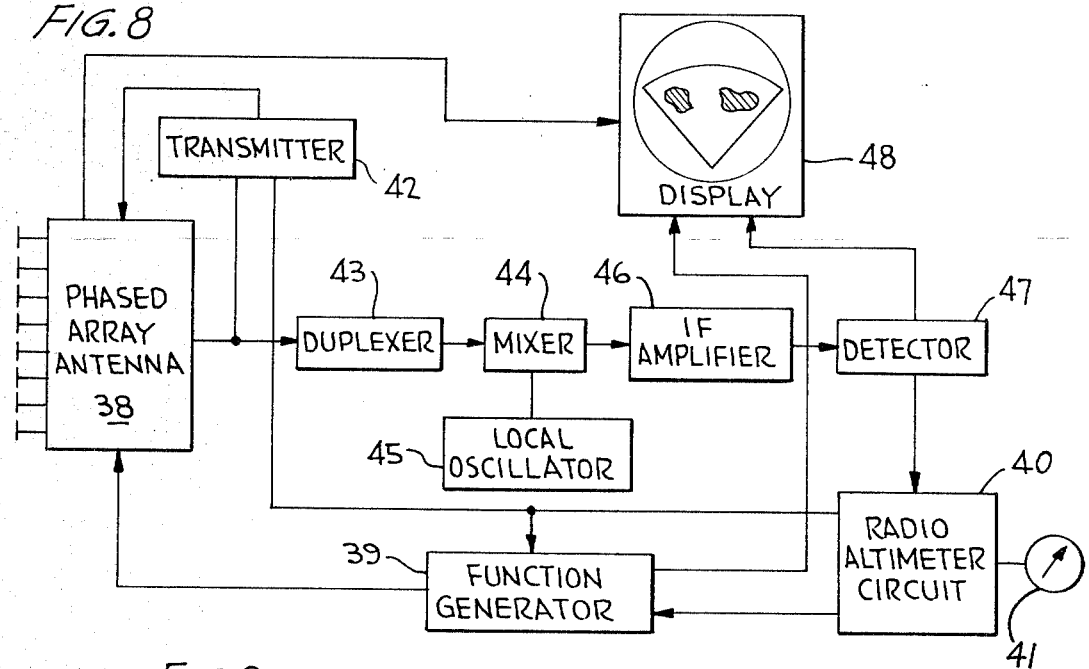
FIG. 8 is an alternate antenna configuration which uses a phased array antenna for beam positioning and a radio altimeter for providing an altitude information to the circuitry of FIG. 5.

Another embodiment employing a phased array antenna, without departing from the spirit and scope of the invention, is illustrated in FIG. 8. A phased array antenna 38 follows the elevation beam steering program generated by the function generator 39 which receives altitude information from a radio altimeter 40. The altimeter 40 also provides visible height information to the pilot through indicator 41. A transmitter 42 provides range signals to the antenna 38, while a duplexer 43, a mixer 44, a local oscillator 45, an IF amplifier 46, and detector 47 prepare the received echo signals for display on display 48.

Figure 9:
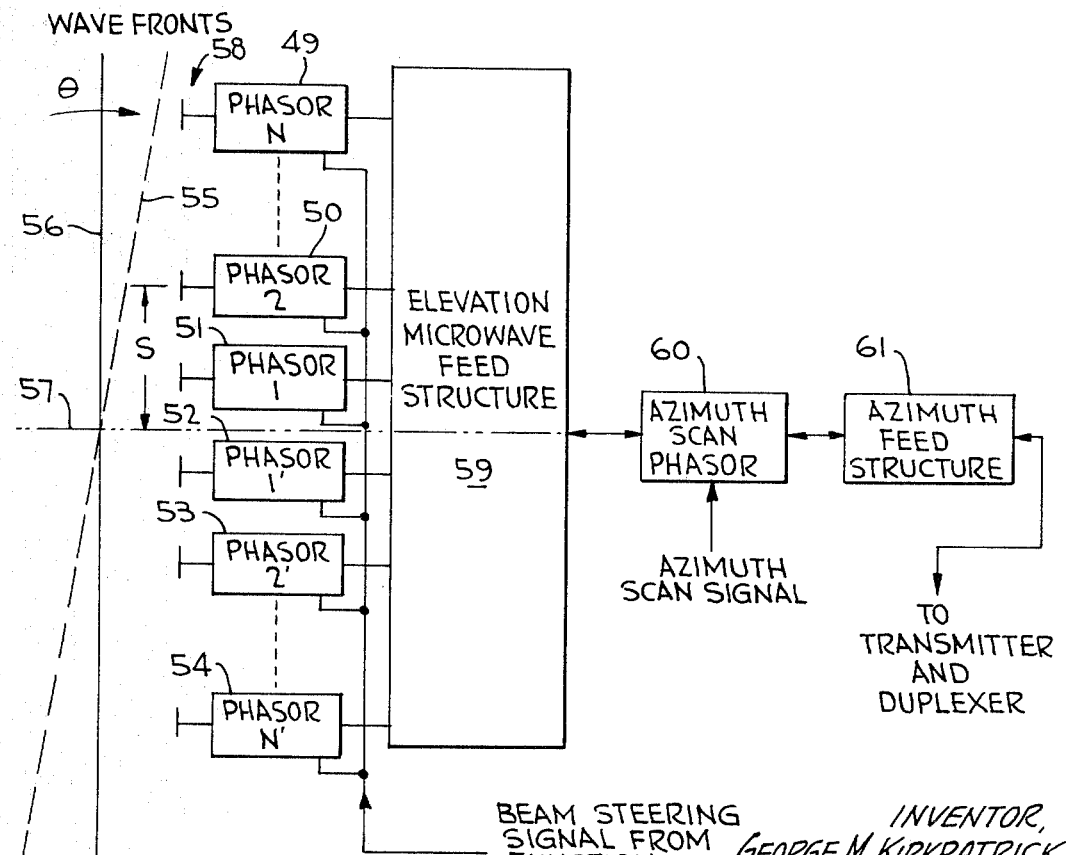
FIG. 9 is a more detailed diagram of the phased array component of the radar system of FIG. 8.

The operation of the antenna array shown in FIG. 8 is shown in greater detail in FIG. 9. Phasors 49 through 54 can be either analog or digital and are used to steer the elevation beam. The wavefront accepted by the antenna is shown in the elevated position at 55 to position the antenna beam above nearby clutter and in the vertical position 56 for the reception of long range targets. The phase shift introduced by each phasor 1 through N is proportional to the distance S of the phasor from the axis of symmetry at 57. The phase shift provided by the phasors 1' through N' is the negative of the phase shift of the phasors 1 though N.

It is convenient to provide only phase shifts from which multiples of $2\pi$ are subtracted when a particular phase shift exceeds one or more multiples of $2\pi$ radians. The negative phase shifts can be the complements of the positive phase shifts or equal to $2\pi$ minus the corresponding positive phase shift. That is, phasor N' has a phase shift setting of $2\pi$ radians minus the phase shift setting of phasor N. The phase shifted signals are emitted and received by the radiator elements 58 and may be dipoles, waveguides, slots, or other efficient radiation elements. The microwave feed structure 59 combines the signals from the phasor and feeds the azimuth scan phasor 60. As many vertical sets of radiators as are necessary to produce the desired azimuth beam width are combined in the azimuth feed structure 61 after receiving the instructed azimuth scan phase shift in azimuth phasor 60. The azimuth scan can be produced mechanically instead of electrically, by eliminating the azimuth scan phasor 60 and, by mechanically moving the entire structure.

Elevation beam steering signals can be used only on receive as previously described or on both transmit and receive. If the beam is steered for the transmit pulse then sequential techniques are used in the PPI display. Referring to FIG. 8 the radar initially transmits and receives on the high beam and the display 48 presents only the short range weather echoes. Noise and signals at longer ranges are blanked by a signal from function generator 39. On the next scan the beam is lowered and the short range ground return is blanked from the display 48 and only the long range weather echoes are presented by the signal from the function generator 39. Sequential techniques can also be applied to systems using electromechanical scan in both elevation and azimuth. At the end of each azimuth scan the elevation scan is changed in accord with the signal from the function generator and the display is gated to present short range information when the beam is elevated above the horizontal and long range information when the beam is directed at the horizon.

While specific embodiments of this invention have been shown and described, other embodiments may be made without departing from the spirit and scope thereof.

The invention described herein was made in the performance of work under NASA Contract NAS 12–2032 and is subject to the provisions of Section 305 of the National Aeronautics and Space Act of 1958 (72 Stat. 435; 42 U.S.C. 2457).

What is new and desired to be secured by Letters Patent of the United States is:

1. A system for detecting long range and short range elevated targets in the presence of clutter including:
   a. an aircraft;
   b. radar means carried by the aircraft, the radar means comprising;
      1. means for transmitting ranging pulses for illuminating said targets which respond by reflecting echo signals;
      2. receive antenna means responsive to said echo signals including at least one radiator for providing a receive antenna beam in a first beam position;
      3. first circuit means for steering said receive antenna beam from said first beam position to a second beam position in accordance with a beam steering program, coupled to said antenna means and including first and second channels, said first channel including a first duplexer and said second channel including a series connected second duplexer, a controllable attenuator, and a controllable phasor.
      4. a function generator coupled to an altitude reference and to said controllable attenuator and said controllable phasor for generating said beam steering program;

5. second circuit means including series connected mixer, amplifier and detector for deriving substantially clutter free information regarding said elevated targets from said receive antenna means;

6. display means coupled to said second circuit means for displaying said signal derived from said antenna means.

2. A radar system carried aloft by aircraft for detecting long range and short range elevated targets while suppressing ground clutter, the system comprising:

means for transmitting ranging pulses for illuminating said targets which respond by reflecting echo signals;

receive antenna means responsive to said echo signals for providing a receive antenna beam in a first beam position;

first circuit means for steering said receive antenna beam from said first beam position to a second beam position in response to a beam steering program, said first circuit means coupled to said antenna means and including first and second channels, said first channel including a first duplexer and said second channel including a second duplexer, a controllable attenuator, and a controllable phasor connected in circuit;

a function generator responding to an altitude reference for generating output signals to said controllable attenuator and said controllable phasor which generate said beam steering program;

second circuit means including series connected mixer, amplifier and detector for deriving substantially clutter free information regarding said elevated targets from said receive antenna means; and display means coupled to said second circuit means for displaying said signal derived from said antenna means.

3. A radar system carried aloft by aircraft for detecting long range and short range elevated targets while suppressing ground clutter, a system having a transmitter, and a receiver comprising:

an antenna having at least two radiators;

a first hybrid junction connected to the radiators for providing sum and difference return signals;

a first circuit path including a duplexer connected between the first hybrid junction and a second hybrid junction for transmitting the sum signal therebetween;

a second parallel circuit path connected between the first and second junctions and including a controllable attenuator for attenuating the difference signal, controllable phasor means connected to the output of the attenuator for selectively varying the phase shift of the attenuated difference signal, and a second duplexer connected to the output of the phasor means for coupling the phase shifted difference signal to the second hybrid junction;

the function generator having outputs connected to inputs of the attenuator and phasor means for controlling the attenuator and the phasor means, respectively, in accordance with a beam steering program;

height reference means connected to the function generator for making the beam steering program a function of antenna altitude;

means connecting the transmitter to the function generator for making the beam steering program a function of target range;

the sum and difference signals being combined at the second junction point to form a steered receive beam signal.

4. The subject matter set forth in claim 3 together with frequency conversion means connected to the second junction for converting the steerable receive beam signal; and means for displaying information received at the antenna, the displaying means having a first input connected to the transmitter for providing display timing signals, a second input for providing a signal responsive to the angular orientation of the antenna, and a third input connected to the frequency conversion means for providing target information to the display means.

* * * * *